(12) United States Patent
Wartko

(10) Patent No.: US 7,252,229 B1
(45) Date of Patent: Aug. 7, 2007

(54) VOTING SYSTEM FOR MAKING FAMILY DECISIONS AND METHOD EMPLOYING SUCH SYSTEM

(76) Inventor: Karen J Wartko, 14204 W. 72nd St., Shawnee, KS (US) 66216

( * ) Notice: Subject to any disclaimer, the term of this patent is extended or adjusted under 35 U.S.C. 154(b) by 590 days.

(21) Appl. No.: 10/835,364

(22) Filed: Apr. 29, 2004

(51) Int. Cl.
*G06F 17/60* (2006.01)
(52) U.S. Cl. ....................... 235/386; 235/385
(58) Field of Classification Search ............... 235/386, 235/385; 705/6, 10, 12, 80
See application file for complete search history.

(56) References Cited

U.S. PATENT DOCUMENTS

| | | | | |
|---|---|---|---|---|
| 5,800,181 A | * | 9/1998 | Heinlein et al. | 434/322 |
| 5,950,217 A | * | 9/1999 | Heinlein et al. | 715/530 |
| 2002/0038236 A1 | * | 3/2002 | Schechter et al. | 705/12 |
| 2003/0033302 A1 | * | 2/2003 | Banerjee et al. | 707/6 |
| 2004/0148207 A1 | * | 7/2004 | Smith et al. | 705/6 |

* cited by examiner

*Primary Examiner*—Daniel Stcyr

(57) ABSTRACT

In accordance with the present invention, there exists a voting system for making family decisions. A chart with write-on, wipe-off and steel properties is used to record preferred choices in family decisions on which to vote. One such application is the charting of baby names for a new baby. Magnets with the designations, Yes, No and ? are used by the family members to vote for each potential baby name. The name will be chosen when the voters reach a consensus on one baby name.

20 Claims, 4 Drawing Sheets

23

| NAMESAKES | | | | | | | Naming baby, Family style |
|---|---|---|---|---|---|---|---|
| | | Mom | Dad | #13 | | | |
| #27 | | | | | | | #12 |
| | | | | | | | |
| | | | | | | | |
| | | | | | | | |
| | | | | | | | |
| | | | | | | | |
| | | | | | | | |

FIGURE 1

VOTING SYSTEM FOR MAKING FAMILY DECISIONS AND METHOD EMPLOYING SUCH SYSTEM

FIELD OF THE INVENTION

This invention relates to a charting system that records votes related to family decisions and method for employing such system.

BACKGROUND OF THE INVENTION

Group decisions require open communication and shared ideas, especially those decisions faced by families. Decisions such as the choice of a new baby's name, the choice of vacation or travel location, the choice of a kind of pet, the naming of such pet and other similar choices require open communication among family members. In one such decision, the choice of a new baby name, there exists many facets to a seemingly simple endeavor.

Choosing the name for a new baby has always been an exciting yet difficult experience for new families. Each family member has their own perceptions of a name. The name choice is a critical decision that has the potential of affecting a child's future immeasurably; just ask any boy named Poindexter or girl named Bambi. Name perceptions often exist from knowing someone with a certain name. If, for instance, a man knew a girl named Katherine in grade school and she was a large-framed bully, he may attach that stereotype to the name itself. While Mom may think Katherine is a beautiful and graceful name for their new daughter, Dad does not. Some names evoke images of the famous people who bear them. Naming a child Keanu or Cher can disable the child with a lifetime of combating other people's perceptions.

When selecting a new baby's name it is beneficial to see the choices in print. The ability to see and say the names often help the family as preferences can change the more often the names are said aloud or read.

Yet another, not so readily recognized issue also exists when naming a new baby. If older siblings are present, there exists the possibility of hurt feelings if the older children are not included in the choosing of the new baby's name. This can lead to alienation and resentment of the new baby.

Issues with other family decisions, such as the choice of vacation or travel location, the choice of a kind of pet, the naming of such pet, the choice of a college and other similar choices can all benefit from the use of a charted voting system. Therefore, a need exists for a visual charting system that focuses on group interaction and the sharing of ideas or perceptions.

There is no prior art addressing these specific issues.

It is therefore an object of the invention to provide a group voting system.

It is another object of the invention to foster a fun and family-centered activity.

It is another object of the invention to provide better communication between family members.

It is another object of the invention to give the ability to visualize the voters' choices over any period of time.

It is another object of the invention to allow for changed votes.

It is another object of the invention to give an ongoing visual picture of which choices are preferred by the majority and the minority of voters.

It is another object of the invention to provide a means to voting in a fair environment allowing all voters' choices to be recognized.

It is another object of the invention to involve family members in decisions which will affect future relationships.

It is another object of the invention to facilitate a voting system with a positive outcome.

It is another object of the invention to provide a forum where participants can discuss the reasoning behind voting a particular way.

SUMMARY OF THE INVENTION

In accordance with the present invention, there exists a voting system that is both functional and decorative. A chart, imprinted with a voting grid, utilizes the horizontal axes to mark the group choices to be voted upon. The vertical axes are assigned to specific voters for marking their voting choices. Decision-making pieces communicate positive, negative or unsure votes. These physical elements are used in conjunction with a process for facilitating communication and enjoyment among the group of voters.

BRIEF DESCRIPTION OF THE DRAWINGS

A complete understanding of the present invention may be obtained by reference to the accompanying drawings, when considered in conjunction with the subsequent, detailed description, in which:

FIG. 1 is a perspective view of a chart in accordance with the invention;

For purposes of clarity and brevity, like elements and components will bear the same designations and numbering throughout the FIGURES.

DESCRIPTION OF THE PREFERRED EMBODIMENT

FIG. 1 is a perspective view of a Chart 23 in accordance with the invention. The Chart 23 measures 11" in height and 14" in width. The Chart 23 consists of a grid on which there exists six separate vertical Voter Columns 12, measuring 1" in width and 1" in height. A Choice to be Voted Upon 27 column is located to the left of the six voter columns 12 and measures 1" in height and 8" in width. A Voter Identification 13 row measures 14" in width and 4" in height. Within the Voter Identification 13 row, the first left Voter Column is designated with the word "Mom" and the second left Voter Column is designated with the word "Dad". Subsequent columns are left blank. The Chart 23 can include, in addition to the NAMESAKES™ designation, the accompanying tagline: Naming Baby, Family Style.

Figure 2:
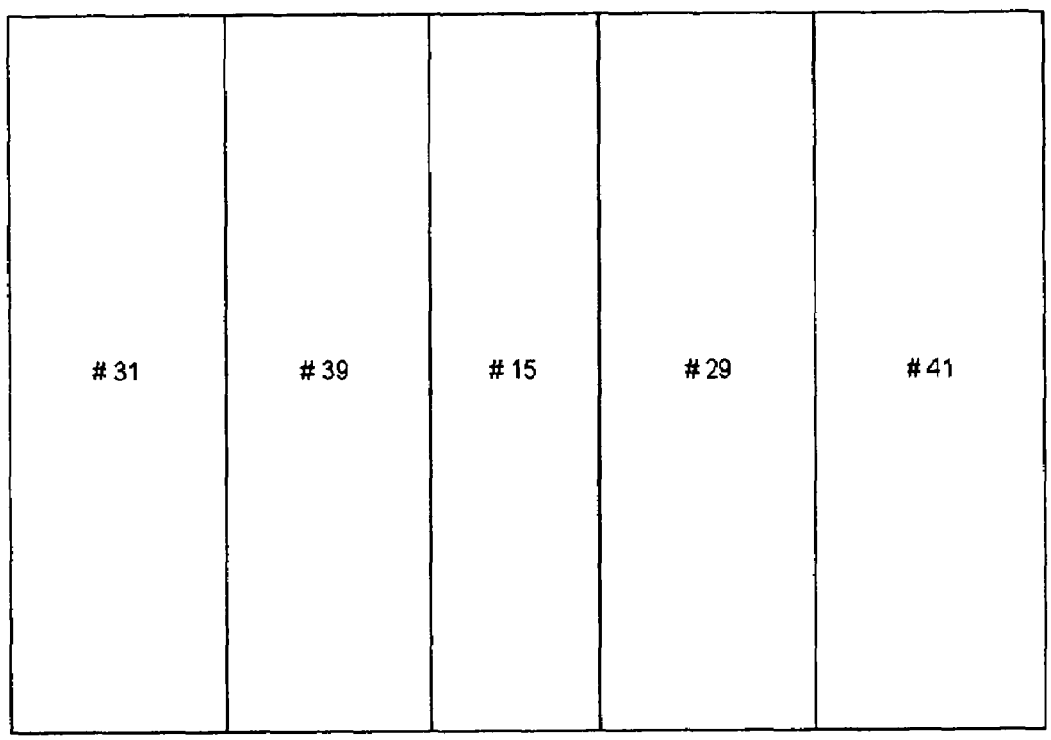
FIG. 2 is a cross sectional view of a chart shown in FIG. 1.

FIG. 2 is a cross sectional view of the Chart 23 shown in FIG. 1. It delineates five components that are pressed and adhered to make up the Chart 23. An Outer layer of the Chart 23 is the Polylaminate Film Backside 31 which has a thickness of 0.010 millimeter. This Polylaminate Film is adhered with adhesive to a Printed Paper backside 39. The Printed Paper backside 39 consists of paper stock with a thickness of 0.010 millimeter. The Printed Paper backside 39 is adhered to a Steel 15, which is 0.006 millimeters thickness. The Steel 15 is adhered with adhesive to the Printed Paper frontside 29 which consists of paper stock with a thickness of 0.010 millimeter. This paper is preprinted with the voting grid as described above. A layer of Polylaminate Film Frontside 41 is adhered with adhesive. This Polylaminate Film measures 0.010 in thickness.

Figure 3:
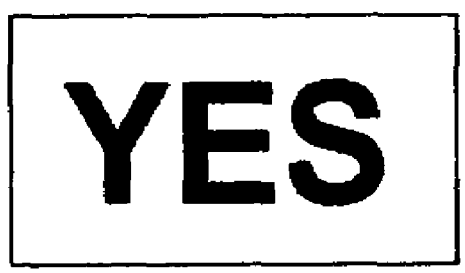
FIG. 3 is a perspective view of a decision-making pieces in accordance with the invention.
Figure 3:
Figure 3:
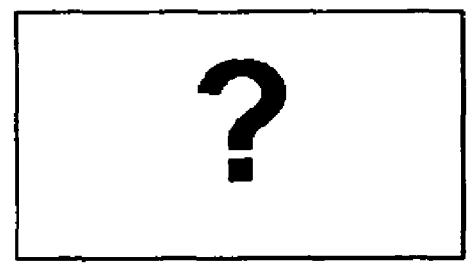

FIG. 3 is a cross perspective view of decision-making pieces in accordance with the invention. These pieces are 1"×1" square and are preprinted with appropriate voting responses. There exists three different decision-making pieces. Decision-Making Piece designated "Yes" 33, which displays the word "YES". Decision-Making Piece designated "No" 45, shows the imprint "NO" and Decision-Making Piece designated "?" 47, which bears the imprint "?"

Figure 4:
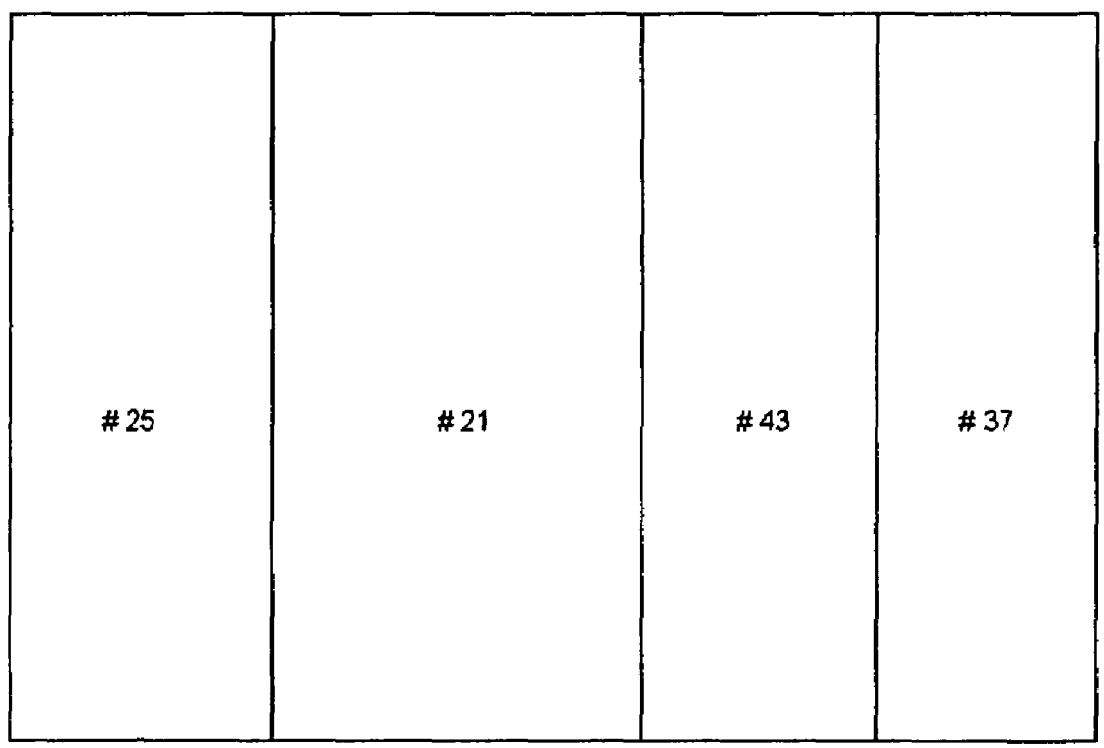
FIG. 4 is a cross sectional view of a decision-making pieces shown in FIG. 3.

FIG. 4 is a cross sectional view of the decision-making pieces shown in FIG. 3. The pieces are constructed with a Magnetic Material 25 with a thickness of 0.020 millimeter. The Magnetic Material 25 is adhered with adhesive to a Foam 21, measuring 1/16". Adhered to the Foam 21 adhesively is a Printed Paper 43 which is 0.010 millimeters. This imprinted paper is described above with the three different appropriate voting responses. A Polylaminate Film-Decision Pieces 37 is adhered with adhesive to the Printed Paper 43. This Polylaminate Film is 0.010 millimeter thick.

In operation, the Chart 23 in FIG. 1, with its imprinted grid, contains Voter Columns 12 which are assigned to specific voters and are used to place the decision-making pieces of each participating voter.

The Choice to be Voted Upon 27, is designed to display the voting choices. Baby names or other vote choices are written with a write-on, wipe-off pen in this column so that they may be voted upon by participating group members.

The Voter Identification 13 row accommodates the names of voting group members to be assigned to a particular column. The first left Voter Column, designated with the word "Mom" is assigned to the Mother. The second left Voter Column, designated with the word "Dad" is assigned to the Father to vote. Subsequent columns are left blank and are marked with other voters' names with a write-on, wipe-off pen, which in turn, marks the associated column below to the voter's name in the corresponding row.

The five components delineated in FIG. 2, are pressed and adhered to make up the Chart 23. The Outer layer of the Chart 23 is the Polylaminate Film Backside 31 which gives the back side of the Chart 23 its glossy finish and subsequently its write-on, wipe-off capabilities. The Printed Paper backside 39 consists of paper stock which can be preprinted with general information or instructions regarding the group voting process.

The properties of the Steel 15 allows the magnetic decision-making pieces to adhere to the Chart 23. The Printed Paper frontside 29, is preprinted with the voting grid as described above. A final layer of Polylaminate Film Frontside 41 gives the front of the Chart 23 its glossy finish and subsequently its write-on, wipe-off capabilities.

The pieces shown in FIG. 3 are the decision-making pieces in accordance with the invention. These pieces, which are preprinted with the appropriate voting responses, "YES", "NO" and "?" are used by the group of voters to mark their like or dislike of the Choice to be Voted Upon 27. The foam 21 is designed to give a three-dimensional property that allows ease of manipulation. A favorable vote would be indicated with the "YES" decision-making piece. An unfavorable vote would be denoted with a "NO" decision-making piece. The decision-making piece bearing the "?" print could be used to mark questionable or unsure opinions.

A process of use for this group voting system begins with choices being made by voting members. In one preferred embodiment, the system is used to choose a new baby's name. Family members choose baby first names they like and enter them into the Choice to be Voted Upon 27 column. The baby names are written with a damp-erase marker. Voters are assigned a voter column which is marked with their name using a damp-erase marker. The first baby name in the column is announced and family members vote in turn by placing the decision-making pieces in the appropriate voter column. The youngest voter makes the first vote. As the voter places his or her magnetic decision-making piece on the board, he or she discusses why he or she likes or dislikes the name. The sharing of stories or perceptions associated with the name is encouraged. Play continues in turn until all the names have been voted upon. Decision-Making Piece designated "Yes" 33 is used to mark that the voter likes the name. Decision-Making Piece designated "No" 45 is used to mark the voter's dislike of the name. Decision-Making Piece designated "?" 47 is used when the voter is unsure of his or her preference.

The Chart 23 shall be left in a visually accessible area. As group members repeatedly see the Chart 23 and read the names several times, they are permitted to change their votes as they change their minds. A time schedule is set, which is determined by the group, to meet and revise the name choices. Names that have received all "NO" votes will be dropped from the Chart 23. Any new name choices may be added at this time and group voting begins again. There is no set time that this charting system can and should be used. It is designed to record changing votes until a consensus is reached. At that point, the process can then be repeated for choosing the middle name of the baby.

This physical voting system and voting method is not limited to the choice of baby names but is designed to be used for all decisions that require or would benefit from group input. Other uses for the Chart 23 and voting method include, but are not limited to, the choice of vacation or travel location, the choice of a kind of pet, the naming of such pet, the choice of a college and other similar choices.

This voting system and voting method solves the aforementioned problems. It provides a group voting system that fosters a fun and family-centered activity. It provides a communication tool for group members and gives the ability to visualize the voters' choices over any period of time. This voting system also allows for changed votes by rearranging the decision-making pieces and it gives an ongoing visual picture of which choices are preferred by the majority and the minority of voters. It provides a means to voting in a fair environment allowing all voters' choices to be recognized and involves group members in decisions which will affect future relationships. The physical voting system facilitates a voting method with a positive outcome and provides a forum where participants can discuss the reasoning behind their votes.

In one preferred embodiment, the physical voting system and voting method addresses the differences in perception of names and their meaning. Through the discussion element, it helps family members communicate about their particular name perceptions. The visibility and longevity of the voting method fits the need or desire to see the baby name or other Choice to be Voted Upon 27 in print and with frequency. Preferences can change the more the Choice to be Voted Upon 27 is read or said aloud. In this preferred embodiment, this voting system and method also helps to incorporate friends and encourage family involvement with the new baby. This type of early involvement can help to foster long term relationships with the baby. Also in this preferred embodiment, the involvement of older siblings is a key benefit of this Chart 23 and method. By involving older siblings in the baby naming process, they can feel more connected to the new arrival. Since the pregnancy period is often a difficult and confusing time for older siblings, this Chart 23 and voting-in-turn method can help give them a sense of contribution and control. This can, in turn, lead to a healthier relationship between siblings when the new baby is born.

Other ramifications include but are not limited to: the choice of a new baby's name, the choice of vacation or travel location, the choice of a kind of pet, the naming of such pet, the choice of college and other similar choices.

Other embodiments include but are not limited to: the Chart 23 can be printed on felt with the decision-making pieces having attached loop and tie fasteners. In this embodiment, the loop and tie fasteners would give the adherence properties required to attach the decision-making pieces to the Chart 23.

Another embodiment involves the Chart 23 being created with a plastic surface and the decision-making pieces created with electrostatic clings.

Another embodiment would be a Chart 23 that would utilize a writing instrument to record the votes of the group members.

Other embodiments include any other physical variation that allows the adherence properties that are needed to attach the decision-making pieces to the Chart 23.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A voting system for making family decisions and method employing such system for charting the votes of members of a concerned group of individuals in order to arrive at a mutually agreeable outcome, comprising:

means for allowing an individual column space for magnetic decision-making pieces to be placed representing the votes of each participant;

means for marking the column with the name of the voter that will be using that column to register his or her votes;

means for providing the steel properties to enable the magnetic decision-making pieces to adhere to the chart;

means for providing a three dimensional property to the decision-making pieces that enables ease of manipulation;

means for accommodating the choices to be voted upon, voters' names and their voting preferences via the attachment of the decision-making pieces, directly attached to said means for marking the column with the name of the voter that will be using that column to register his or her votes, and directly attached to said means for allowing an individual column space for magnetic decision-making pieces to be placed representing the votes of each participant;

means for enabling the magnetic properties to the voting pieces, adhesively adhered to said means for providing a three dimensional property to the decision-making pieces that enables ease of manipulation;

means for accommodating the choice to be voted upon, directly attached to said means for accommodating the choices to be voted upon, voters' names and their voting preferences via the attachment of the decision-making pieces;

means for presenting a preprinted voting grid, adhesively adhered to said means for providing the steel properties to enable the magnetic decision-making pieces to adhere to the chart;

means for providing write-on, wipe-off capabilities, fixedly adhered to said means for presenting a preprinted voting grid;

means for recording a favorable vote, directly attached to said means for enabling the magnetic properties to the voting pieces;

means for providing a printed grid for recording votes, adhesively adhered to said means for providing a three dimensional property to the decision-making pieces that enables ease of manipulation;

means for providing write-on, wipe-off capabilities, fixedly adhered to said means for providing a printed grid for recording votes;

means for providing printed general information, instructions or other related verbiage associated with the group voting system, adhesively adhered to said means for providing the steel properties to enable the magnetic decision-making pieces to adhere to the chart;

means for providing write-on, wipe-off capabilities;

means for providing printed symbols or verbiage which represent favorable, unfavorable and unsure votes;

means for recording an unfavorable vote, directly connected to said means for enabling the magnetic properties to the voting pieces; and means for recording an unsure vote, directly connected to said means for enabling the magnetic properties to the voting pieces.

2. The voting system for making family decisions and method employing such system in accordance with claim 1, wherein said means for allowing an individual column space for magnetic decision-making pieces to be placed representing the votes of each participant comprises a voter columns.

3. The voting system for making family decisions and method employing such system in accordance with claim 1, wherein said means for marking the column with the name of the voter that will be using that column to register his or her votes comprises a voter identification.

4. The voting system for making family decisions and method employing such system in accordance with claim 1, wherein said means for providing the steel properties to enable the magnetic decision-making pieces to adhere to the chart comprises a steel.

5. The voting system for making family decisions and method employing such system in accordance with claim 1, wherein said means for providing a three dimensional property to the decision-making pieces that enables ease of manipulation comprises a foam.

6. The voting system for making family decisions and method employing such system in accordance with claim 1, wherein said means for accommodating the choices to be voted upon, voters' names and their voting preferences via the attachment of the decision-making pieces comprises a flat, laminate finish, printed chart.

7. The voting system for making family decisions and method employing such system in accordance with claim 1, wherein said means for enabling the magnetic properties to the voting pieces comprises a magnetic material.

8. The voting system for making family decisions and method employing such system in accordance with claim 1, wherein said means for accommodating the choice to be voted upon comprises a choice to be voted upon.

9. The voting system for making family decisions and method employing such system in accordance with claim 1, wherein said means for presenting a preprinted voting grid comprises a printed paper frontside.

10. The voting system for making family decisions and method employing such system in accordance with claim 1, wherein said means for providing write-on, wipe-off capabilities comprises a polylaminate film backside.

11. The voting system for making family decisions and method employing such system in accordance with claim 1, wherein said means for recording a favorable vote comprises a decision-making piece designated "yes".

12. The voting system for making family decisions and method employing such system in accordance with claim 1, wherein said means for providing a printed grid for recording votes comprises a paper with print.

13. The voting system for making family decisions and method employing such system in accordance with claim 1, wherein said means for providing write-on, wipe-off capabilities comprises a polylaminate film-decision pieces.

14. The voting system for making family decisions and method employing such system in accordance with claim 1, wherein said means for providing printed general information, instructions or other related verbiage associated with the group voting system comprises a printed paper backside.

15. The voting system for making family decisions and method employing such system in accordance with claim 1, wherein said means for providing write-on, wipe-off capabilities comprises a polylaminate film frontside.

16. The voting system for making family decisions and method employing such system in accordance with claim 1, wherein said means for providing printed symbols or verbiage which represent favorable, unfavorable and unsure votes comprises a printed paper.

17. The voting system for making family decisions and method employing such system in accordance with claim 1, wherein said means for recording an unfavorable vote comprises a decision-making piece designated "no".

18. The voting system for making family decisions and method employing such system in accordance with claim 1, wherein said means for recording an unsure vote comprises a decision-making piece designated "?".

19. A voting system for making family decisions and method employing such system for charting the votes of members of a concerned group of individuals in order to arrive at a mutually agreeable outcome, comprising:
   a voter columns, for allowing an individual column space for magnetic decision-making pieces to be placed representing the votes of each participant;
   a voter identification, for marking the column with the name of the voter that will be using that column to register his or her votes;
   a steel, for providing the steel properties to enable the magnetic decision-making pieces to adhere to the chart;
   a foam, for providing a three dimensional property to the decision-making pieces that enables ease of manipulation;
   a flat, laminate finish, printed chart, for accommodating the choices to be voted upon, voters' names and their voting preferences via the attachment of the decision-making pieces, directly attached to said Voter Identification, and directly attached to said Voter Columns;
a magnetic material, for enabling the magnetic properties to the voting pieces, adhesively adhered to said Foam;
   a choice to be voted upon, for accommodating the choice to be voted upon, directly attached to said Chart;
   a printed paper frontside, for presenting a preprinted voting grid, adhesively adhered to said Steel;
   a polylaminate film backside, for providing write-on, wipe-off capabilities, fixedly adhered to said Printed Paper Frontside;
   a decision-making piece designated "yes", for recording a favorable vote, directly attached to said Magnetic Material;
   a paper with print, for providing a printed grid for recording votes, adhesively adhered to said Foam;
   a polylaminate film-decision pieces, for providing write-on, wipe-off capabilities, fixedly adhered to said Paper with Print;
   a printed paper backside, for providing printed general information, instructions or other related verbiage associated with the group voting system, adhesively adhered to said Steel;
a polylaminate film frontside, for providing write-on, wipe-off capabilities;
   a printed paper, for providing printed symbols or verbiage which represent favorable, unfavorable and unsure votes;
   a decision-making piece designated "no", for recording an unfavorable vote, directly connected to said Magnetic Material; and
   a decision-making piece designated "?", for recording an unsure vote, directly connected to said Magnetic Material.

20. A voting system for making family decisions and method employing such system for charting the votes of members of a concerned group of individuals in order to arrive at a mutually agreeable outcome, comprising:
   a voter columns, for allowing an individual column space for magnetic decision-making pieces to be placed representing the votes of each participant;
   a voter identification, for marking the column with the name of the voter that will be using that column to register his or her votes;
   a steel, for providing the steel properties to enable the magnetic decision-making pieces to adhere to the chart;
   a foam, for providing a three dimensional property to the decision-making pieces that enables ease of manipulation;
   a flat, laminate finish, printed chart, for accommodating the choices to be voted upon, voters' names and their voting preferences via the attachment of the decision-making pieces, directly attached to said Voter Identification, and directly attached to said Voter Columns;
a magnetic material, for enabling the magnetic properties to the voting pieces, adhesively adhered to said Foam;
   a choice to be voted upon, for accommodating the choice to be voted upon, directly attached to said Chart;
   a printed paper frontside, for presenting a preprinted voting grid, adhesively adhered to said Steel;
   a polylaminate film backside, for providing write-on, wipe-off capabilities, fixedly adhered to said Printed Paper Frontside;
   a decision-making piece designated "yes", for recording a favorable vote, directly attached to said Magnetic Material;

a paper with print, for providing a printed grid for recording votes, adhesively adhered to said Foam;

a polylaminate film-decision pieces, for providing write-on, wipe-off capabilities, fixedly adhered to said Paper with Print;

a printed paper backside, for providing printed general information, instructions or other related verbiage associated with the group voting system, adhesively adhered to said Steel;

a polylaminate film frontside, for providing write-on, wipe-off capabilities;

a printed paper, for providing printed symbols or verbiage which represent favorable, unfavorable and unsure votes;

a decision-making piece designated "no", for recording an unfavorable vote, directly connected to said Magnetic Material; and a decision-making piece designated "?", for recording an unsure vote, directly connected to said Magnetic Material.

* * * * *